United States Patent [19]

Bremer

[11] 4,343,378

[45] Aug. 10, 1982

[54] METHOD AND APPARATUS FOR LUBRICATING BEARINGS

[75] Inventor: C. Hermann Bremer, Remscheid, Fed. Rep. of Germany

[73] Assignee: Barmag Barmer Maschinenfabrik, Remscheid, Fed. Rep. of Germany

[21] Appl. No.: 191,348

[22] Filed: Sep. 26, 1980

[30] Foreign Application Priority Data

Sep. 29, 1979 [DE] Fed. Rep. of Germany ....... 2939604

[51] Int. Cl.³ .......................... D03J 1/00; F16N 7/26
[52] U.S. Cl. ................... 184/6.26; 184/55 R; 139/1 R
[58] Field of Search .............. 184/6.26, 55 R, 55 A; 139/1 C, 1 R, 45

[56] References Cited

U.S. PATENT DOCUMENTS

| 2,457,813 | 1/1949 | Flagge | 184/55 A |
| 3,834,493 | 9/1974 | Hubert | 184/6.26 X |
| 3,941,210 | 3/1976 | Saretzky | 184/6.26 |
| 4,205,708 | 6/1980 | Burgbacher | 184/6.26 X |
| 4,284,174 | 8/1981 | Salvana et al. | 184/6.26 X |

FOREIGN PATENT DOCUMENTS 1204607 9/1960 United Kingdom .
1141371 1/1969 United Kingdom .

Primary Examiner—David H. Brown
Attorney, Agent, or Firm—Bell, Seltzer, Park & Gibson

[57] ABSTRACT

A method and apparatus is provided which is adapted for lubricating each of a plurality of bearings in a large multi-station machine or the like, and wherein a single duct extends along the machine, and a branch line extends from the duct to each bearing. A porous oil storage insert is positioned in each branch line immediately adjacent the discharge end thereof. Means are also provided for sequentially delivering to the duct (1) a low pressure airstream with entrained oil mist such that the entrained oil is accumulated in each of the oil storage inserts, (2) an oil free low pressure airstream for cleaning the duct and cooling and cleaning the bearing, and (3) a high pressure airstream for periodically propelling the accumulated oil from the storage inserts and onto the adjacent bearings at high speed. An accurately predetermined quantity of oil may thereby be intermittently supplied to each bearing.

22 Claims, 3 Drawing Figures

U.S. Patent      Aug. 10, 1982      4,343,378
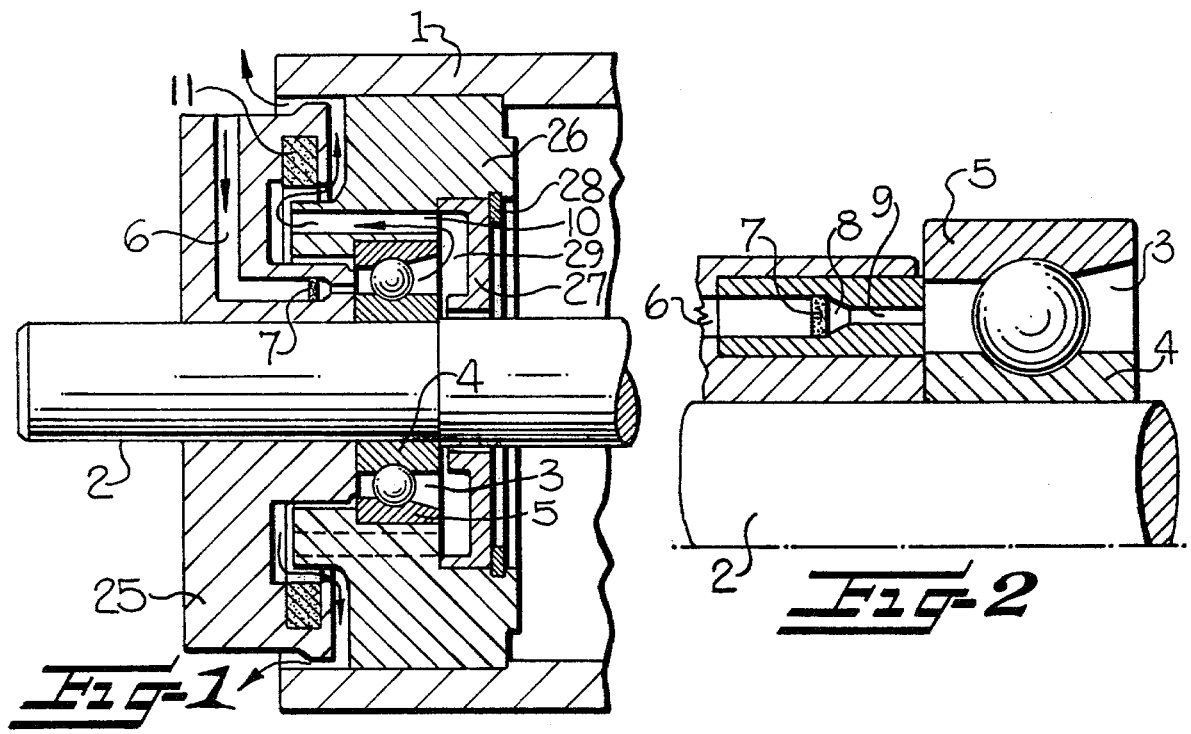
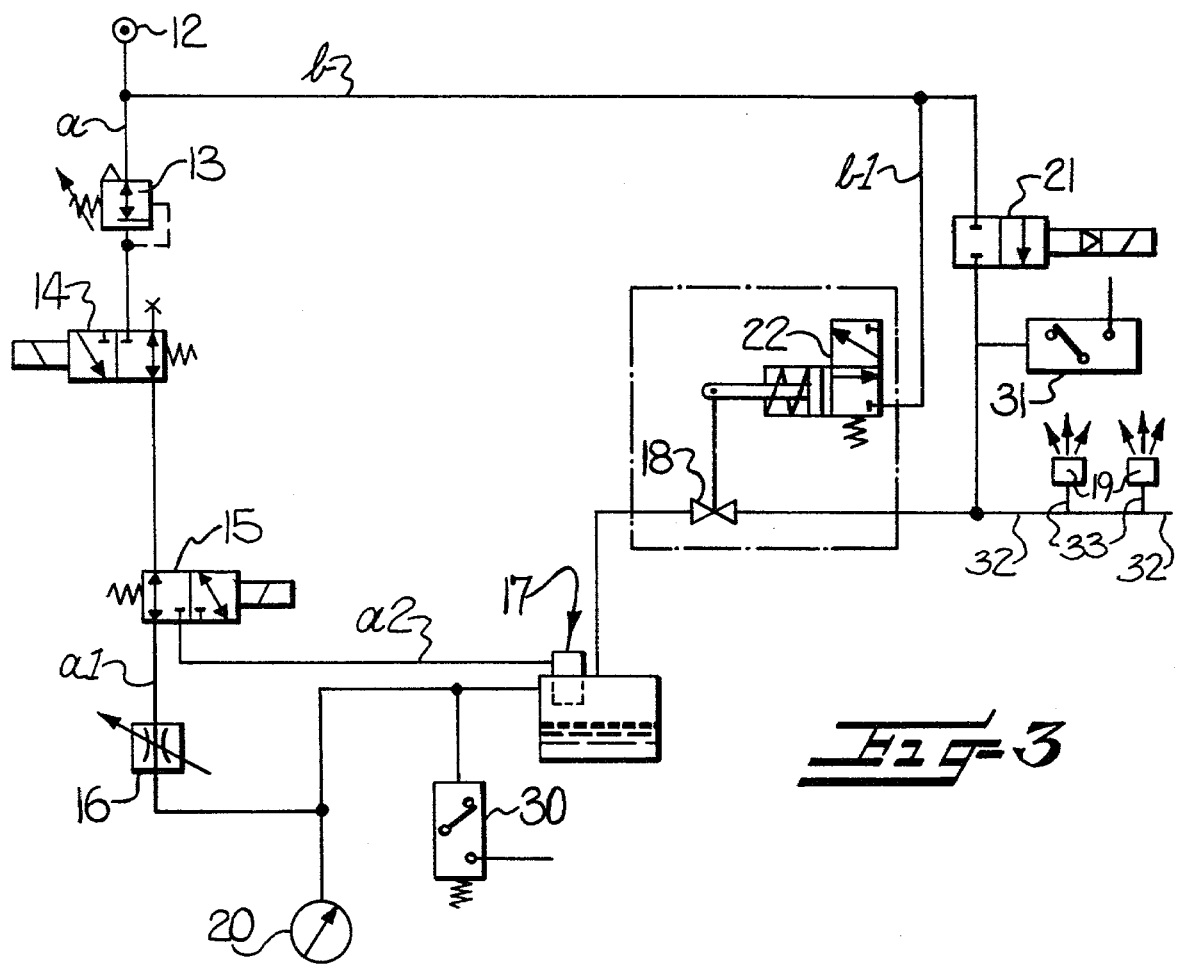

METHOD AND APPARATUS FOR LUBRICATING BEARINGS

The present invention relates to a method and apparatus for lubricating bearings with oil, and which is particularly useful in supplying oil to each of a plurality of bearings in a large multi-station machine, such as a textile yarn processing machine having a plurality of winding heads, open-end spinning rotors, friction twisting heads, or the like, along its length.

In conventional oil mist lubrication systems, the lubricating oil is atomized by compressed air and the microdroplets are carried with the air through a supply line to the lubrication point or points. In doing so, the individual lubrication points are provided, continuously or in intervals, with small oil quantities which are measured as accurately as possible. When centrally supplying the lubrication points through a pneumatic distributing system of this type, it is unavoidable that some of the oil separates from the main oil flow while it is being transported in the airstream, and separated oil settles on the tube walls of the supply line system and there forms an oil film. Under certain conditions, the separated oil and resulting film may effect the main oil flow in an undesirable manner. Thus, it is desirable that the lubrication oil contained in the oil mist not settle on the walls of the supply lines. To accomplish this, certain velocities of flow and pressure ratios are maintained in the supply lines. However, even if these conditions are followed, the formation of oil films on the tube wall cannot entirely be prevented. Moreover, there is the problem that it is very difficult to oil mist lubricate high speed bearings, since a high speed bearing forms a surrounding barrier layer of air in which the microdroplets of the oil mist cannot easily penetrate. This barrier air layer around a high speed bearing can be penetrated by the oil mist only when correspondingly high velocities of flow and pressures are maintained in the supply line for the oil mist, such as by having a nozzle precede the bearing. Yet the oil mist is accelerated in the nozzle in such a manner that the exchange of impulse leads to an accumulation of droplets and a separation of oil from the compressed-air current. The degree of separation increases with the obtained speed, since the energy of impact of the droplets favors the accumulation, and the buffer effect of the air between the microdroplets is reduced by the conversion of static into dynamic pressure. Consequently, in the known oil lubrication systems, the speeds and pressures to be selected for the supply line preceding the nozzle are limited as to their maximum values, and thus the energy of the microdroplets in the oil mist is not sufficient to force their way through the air barrier layer in front of the bearing and penetrate to the bearing.

The German Pat. No. 22 25 619 discloses an oil lubrication system for high speed bearings, in which oil is supplied through a nozzle located in the area of the bearing, with a discharge bore being connected on the side of the bearing facing away from the oil supply line, which discharge bore terminates in a bore of a compressed air line, in which a partial vacuum is generated by injector action. In this known oil lubrication system, a drop in pressure thus occurs between the pressure of the oil mist supplied and the compressed air on one hand, and the partial vacuum generated at the bearing on the other hand. The disadvantage of this known oil lubrication system for high speed bearings lies in the fact that the arrangement of a separate air line extending behind the bearing to generate the partial vacuum is relatively expensive, and the continuous generation of the partial vacuum is costly.

Also known are spray oil lubrication systems for high speed bearings, in which the lubrication oil and the compressed air are supplied in separate lines to a point immediately in front of the bearing, where the lubrication oil is sprayed by the compressed air. However, this known system involves a very high installation cost since separate lubrication oil and compressed air supply lines must be provided to each bearing point.

It is an object of the present invention to provide a method and apparatus for oil lubricating bearings, which can simply and effectively be carried out without requiring high feed pressures, or costly constructional details, such as separate partial vacuum systems behind the bearing point.

It is also an object of the present invention to provide an oil lubricating system which employs an airstream having oil mist droplets entrained therein and so as to be adapted for conveying the oil droplets from one end of a machine to each of a large number of lubrication points along its length, and wherein a precisely predetermined small quantity of oil may be intermittently supplied to each lubrication point. In this regard, it will be apparent that the transportation of an oil mist is less dangerous with regard to pollution as compared to a current of oil, which is especially true in textile plants. Also, it is very difficult to transport and store small quantities of an oil current, which renders it difficult to avoid applying too much oil to the bearings.

It is another object of the present invention to provide an oil lubricating system wherein a high speed jet of oil is directed onto the bearing so as to overcome the resistance of any adjacent air currents generated by the movement of the bearing or the like.

It is still another object of the present invention to provide an oil lubricating system having provision for selectively conducting low pressure, oil-free air through the air duct system to effectively remove any oil film, to cool the bearing, and to carry away any dust-laden air adjacent the bearing.

These and other objects and advantages of the present invention are achieved in the embodiment illustrated herein by the provision of a method and apparatus which includes the steps of directing air having oil mist droplets entrained therein through a passageway under relatively low pressure, and with the passageway extending to a discharge end located adjacent the bearing. The entrained oil is accumulated from the airstream at a location in the passageway immediately upstream of the discharge end. A relatively high pressure airstream is then periodically directed through the passageway to propel at least a portion of the accumulated oil from the passageway at high speed and onto the bearing.

In the preferring embodiment, the entrained oil mist droplets are accumulated from the airstream in a porous storage insert which is positioned in the passageway, and with the insert being adapted to condense the oil droplets on the surfaces thereof. Further, the above steps are cyclically repeated in a predetermined time sequence to periodically lubricate the bearing with a predetermined amount of oil, with the predetermined quantity being controllable by the capacity of the storage insert, the quantity of entrained oil in the airstream, and the time during which the airstream with the entrained oil is conveyed through the passageway.

The method and apparatus according to the present invention accomplishes an effective oil lubrication of a bearing, in particular high speed bearings, without requiring a constant supply of highly compressed air to the supply line system so as to provide the oil droplets with the necessary energy to force their way through the barrier air layer. To further assure the desired speed, a constriction is preferably placed in the passageway between the porous storage insert and the discharge end, which serves to reduce the cross sectional area of the passageway and thus condense the airstream and increase its speed as it exhausts from the discharge end. Thus a very high speed is imparted to the lubricating oil droplets, which is sufficient to penetrate the barrier air layer surrounding the bearing, and the oil droplets are thus able to settle effectively on the bearing when they hit the bearing surfaces.

The lubricating oil is carried to the bearing by a charge of the high pressure air which is generated in intervals or by impulses, and which forces the accumulated oil from the porous storage insert. The oil is then sprayed through the constriction to the bearing. Typically, an operating pressure of the airstream of approximately 100 millibar (i.e. superatmospheric) is maintained in the supply line system for the oil lubrication system. The airstream carries the supplied oil mist droplets to the porous storage insert at speeds ranging from 2 to 10 m/sec., and preferably at about 5-7 m/sec. At these pressures and speeds, practically no oil droplets settle on the walls of the passageway.

Simultaneously with the air current flowing through the supply duct system under a pressure of 100 millibar and at a speed ranging from approximately 2 to 10 m/sec., an oil mist generating apparatus is operatively connected to the system at this pressure and speed so that the airstream receives, preferably, a "dry" oil mist. By "dry" oil mist, it is meant that the droplets are so small that they do not moisten the duct or other machine parts before penetrating the storage insert. The more dry the oil mist is, the longer is the distance over which the oil can be transported. From this airstream, the entrained oil is separated and accumulated in the porous storage insert which precedes the bearing. In this process, the oil mist generating apparatus remains connected until the porous storage insert has been at least partially saturated with oil, i.e. oil can still separate and be absorbed.

Before the relatively highly pressurized compressed air is applied to the porous storage insert to force the oil from it, the supply line is preferably flushed with oil-free air for a short period of time, which air flows under a relatively low pressure, for example, at a pressure of about 100 millibar. This oil-free air serves to remove essentially all of the oil droplets from the duct system. It also acts to cool the bearing, and to carry away any dust-laden air from the vicinity of the bearing. For this purpose, the oil mist generating apparatus, which essentially serves for the measurement of a very small quantity of oil per time unit, is disconnected.

The oil is blown out of the porous storage insert in intervals by a compressed air flow at a pressure (superatmospheric) of between about 1 to 10, and preferably about 6 bar, with these conditions being maintained for approximately 1 to 10 seconds. During the flow of the highly pressurized compressed air, the oil mist apparatus remains disconnected.

The lubrication oil forced out of the porous storage insert is conducted through a constriction following the insert, and is directed toward the respective lubrication point. While in the constriction, the oil flow is accelerated to high velocities and sprayed, with the droplets having such a size and energy that they are able to force their way through the barrier air layer in front of the bearing and penetrate to the bearing surfaces.

Some of the objects and advantages of the invention having been stated, others will appear as the description proceeds, when taken in connection with the accompanying drawings, in which FIG. 1 is a fragmentary cross sectional view of a ball bearing installation having an oil lubrication system in accordance with the present invention;

FIG. 2 is an enlarged view of the portion of FIG. 1 illustrating the bearing and the adjacent oil storage insert; and FIG. 3 is a schematic flow diagram of the air duct system for an oil lubrication apparatus in accordance with the present invention, and which is designed to lubricate each of a plurality of bearings in a common machine.

Referring more specifically to the drawings, FIG. 1 indicates at 1 the outside rotor of a type utilized for example in an electric motor or a drive roll of a yarn winding machine. The rotor is supported on the stationary shaft 2 by means of the antifriction ball bearing 3. In the illustrated embodiment, the inner race 4 of the bearing 3 is firmly mounted on the shaft 2, and the outer race 5 of the bearing is mounted in the bearing housing 26, and is held by the thrust ring 27 and snap ring 28. The bearing 3 is connected to an air passageway 6 which extends to a discharge end located immediately adjacent the bearing. Also, a porous storage insert 7 is mounted in the passageway 6 immediately adjacent the discharge end. Passageway 6 is connected to a compressed air source and an oil mist generating apparatus, as more fully described below with reference to the circuit shown in FIG. 3.

The porous storage insert 7 consists of a porous plastic or a sintered metal which is disposed in a position to separate and store the oil from the airstream flowing through the passageway 6. The porous storage insert extends over the entire cross section of the passageway 6, and is followed by a funnel-shaped constriction 8 (FIG. 2) whose discharge opening 9 is directed toward the bearing 3. The storage insert 7 may be a wick, felt, assembly of very tiny balls, or any other porous material of, for example, fibrous, plastic, ceramic or metallic construction.

On the opposite side of bearing 3, and opposite the outlet 9, there is provided a recess 29, which communicates with one or several discharge ducts 10 for carrying away the air current passing through the bearing 3. The discharge duct 10 extends axially through the bearing housing 26, and a ring of absorbant material is mounted on the stationary cover 25, with the ring being designed to absorb any excess oil emerging from the bearing 3. The air flow continues past the ring 11 and leaves the rotor housing 1 in the manner indicated by the curved arrows in FIG. 1.

A high degree of oil separation is obtained in the bearing 3. In this regard, the bearing surfaces require only a certain quantity of oil, and any excess oil is carried away through the discharge ducts and is absorbed by the ring 11 mounted on the cover 25. The ring 11 preferably consists of an absorbant plastic or felt material, and is mounted in an annular pressure defined between the cover 25 and housing 26. The oil droplets emerging from the bearing 3 are carried along by the air flow and settle on the wall of the discharge duct 10. They are then slung radially by the centrifugal force of the rotating bearing housing against the inner face of the ring 11. In this regard, the ring 11 may be mounted either on the stationary cover 25 as shown, or alternatively on the rotating housing 26. In either event, the ring should be mounted so that the travel of the oil droplets is radially directed against the ring.

It will also be understood that the apparatus as shown in FIG. 1 may be designed so that the rotor 1, the race 5 of the bearing 3, and the bearing housing 26 are stationary, with the shaft 2 being rotatable with the race 4 of the bearing and cover 25.

The air passageway 6 leading to the individual lubrication points typically has an inside diameter of about 3 mm and thus the diameter of the porous storage insert 7 also measures about 3 mm. In such case, the storage insert is about 2 mm thick. Of course, these dimensions are exemplary only, and they depend on the dimensions of the bearing 3, and the cross sectional diameter of the passageway 6.

FIG. 3 illustrates the circuit diagram of the compressed air supply. Two lines a and b branch off from compressed air source 12. Line a leads to pressure reduction valve 13 which reduces the air pressure to, for example, 6 bar. Valve 14 (3/2 way valve) in line a is designed to either open or close the line. Valve 15 (3/2 way valve) selectively connects lines a1 or a2. Line a1 carries essentially oil-free air at a typical pressure of between about 100 to 500 millibars through a conventional oil mist generator 17. The air from the line a1 does not receive an oil mist in the generator however, since the line is connected to the side wall of the generator above the oil reservoir, and thus the air passes freely therethrough to the spherical valve 18, and continues to the duct 32 and to the parallel branch lines 33 leading respectively from the duct 32 to the lubrication points 19. While only two lubrication points 19 are illustrated in FIG. 3, it will be appreciated that a large number of lubrication points may be present, such as would be the case in a yarn processing machine having a plurality of rotary bearings associated with winding heads, rotors, friction twisting heads, or the like, along its length. Similar applications are to be found in non-textile machines.

Line a2 leads from valve 15 to the oil mist head of the generator 17, wherein oil mist droplets are entrained in the airstream in the manner of a carburator. The air and entrained oil continues to valve 18, duct 32, branch lines 33, and to lubrication points 19, under a typical pressure of between about 100 to 500 millibars.

The pressure in the line a is adjusted via the pressure reduction valve 13. The oil mist air pressure is secondarily determined by the throttle setting of the oil mist head of the generator 17, and the pressure of the oil-free blower air is secondarily determined by the throttle valve 16, which pressure may be read on the gauge 20.

A charge of relatively highly compressed air (for example about 6 bar) is periodically supplied through valve 21 which is interconnected in line b. When compressed air source 12 supplies air at high pressure through valve 21, line b to the duct 32 and lubrication points 19 is opened, and at the same time spherical valve 18 is closed through line b1 and valve 22 so that the air does not flow back to the oil mist generator. The magnetically operated valves may be actuated in a known, time controlled sequence. Each of the branch lines 33 for the lubrication points 19 includes a storage insert 7, and optionally also a constriction 8 as described above, and the surge of pressure forces the oil which has accumulated in each storage insert 7 outwardly through its associated opening 9, and thus onto the adjacent bearing.

As illustrated in FIG. 3, the air duct system may further include a first transducer 30 for generating a warning electrical signal in the event of an undue pressure drop in the line a1. This warning signal may be designed to operate a relay, whereby the power for the machine is disconnected, or a visable or audible signal may be actuated. A second transducer 31 may similarly be mounted in the high pressure line b as illustrated in FIG. 3.

The following is a specific non-limiting example of an installation embodying the present invention. The installation included fifty ball bearings to be lubricated. Prior tests had indicated that oil in the amount of 4 milligrams (0.004 grams) per hour for each bearing was sufficient to provide maximum life and minimum environmental pollution. To provide this quantity of oil to the bearings, the oil mist apparatus 17 was adjusted such that the oil mist current leaving this apparatus carried about 30 to 40 droplets per minute during an oil mist time of 2 minutes and a pressure of 100 millibar. Subsequently, the oil mist apparatus was switched off by valve 15, whereby an oil-free air current was led through duct a1, the oil reservoir of the oil mist apparatus, the spherical valve 18 and to the lubricating points 19 for a time of 15 seconds and at a pressure of 100 millibar. By adjusting valves 18, 22, 21, a high pressure air current of 6 bar pressure was supplied to the lubricating points 19 during an injection time of 4 seconds. Thereby the oil was ejected from the storage inserts 7 to the respective ball bearings. Afterwards, there was a switch-off time of 60 minutes. It was found to be advantageous to leave an oil-free air current of low pressure (100 millibar) through duct a1 to the bearings for cleaning purposes just before (e.g. for 15 minutes) and/or immediately after the injection time.

In the drawings and specification, there has been set forth a preferred embodiment of the invention and although specific terms are employed, they are used in a generic and descriptive sense only and not for purposes of limitation.

I claim:

1. A method of providing lubricating oil to a bearing and characterized by the high speed application of the oil onto the bearing, and comprising the steps of;

directing under relatively low pressure, air having oil mist droplets entrained therein, through a passageway extending to a location adjacent the bearing to be lubricated, while accumulating entrained oil from the moving air at a location in the passageway upstream of the discharge end, and then directing air under a relatively high pressure through the passageway to propel at least a portion of the accumulated oil therein from the discharge end of the passageway at a high speed and onto the bearing.

2. The method as defined in claim 1 wherein the steps are cyclically repeated in a predetermined time sequence to periodically lubricate the bearing.

3. The method as defined in either of claims 1 or 2 wherein the accumulating step includes accumulating a predetermined quantity of oil, and wherein the predetermined quantity is propelled onto the bearing during the step of directing high pressure air through the passageway.

4. The method as defined in either of claims 1 or 2 comprising the further step of condensing the air flow between the accumulating location and the discharge end of the passageway to thereby increase the velocity of the air flow.

5. The method as defined in either of claims 1 or 2 wherein the accumulating step includes directing the air and entrained oil through a porous material which is adapted to condense the oil onto the surfaces thereof.

6. The method as defined in either of claims 1 or 2 wherein the step of directing air and entrained oil through the passageway includes moving such air and entrained oil at a speed of between about 2 to 10 m/sec., and at a pressure of between about 100 to 500 millibar, to the accumulating location.

7. The method as defined in either of claims 1 or 2 comprising the further step of directing oil-free air under relatively low pressure through the passageway to remove oil therefrom, and such that the oil-free air is directed from the discharge end of the passageway onto the bearing.

8. The method as defined in claim 7 wherein the step of directing oil-free air occurs immediately prior to the step of directing high pressure air through the passageway.

9. The method as defined in claim 8 wherein the step of directing oil-free air occurs after the step of directing air and entrained oil, and the step of accumulating entrained oil, have ceased.

10. The method as defined in claim 7, wherein the step of directing air and entrained oil through the passageway includes moving such air and entrained oil at a speed of between about 2 to 10 m/sec., and at a pressure of between about 100 to 500 millibar, to the accumulating location, and wherein the step of directing oil-free air through the passageway includes moving such oil-free air under a pressure of between about 100 to 500 millibar.

11. The method as defined in claim 10 wherein the step of directing high pressure air through the passageway includes moving air along the passageway at a pressure of between about 1 to 10 bar for a period of between about 1 to 10 seconds.

12. An apparatus for periodically lubricating a bearing or the like and comprising,
means defining a passageway having a discharge end located adjacent the bearing,
means for directing a relatively low pressure airstream having oil mist droplets entrained therein through the passageway,
means positioned within the passageway adjacent the discharge end thereof for accumulating a quantity of the entrained oil from the moving airstream, and
means for selectively terminating said means for directing a low pressure airstream through the passageway and for directing an airstream under a relatively high pressure through the passageway and through said oil accumulating means positioned therein to thereby propel the accumulated oil outwardly from the discharge end of the passageway at a relatively high speed.

13. The apparatus as defined in claim 12 further comprising means for selectively directing an oil-free airstream along said passageway under a relatively low pressure.

14. The apparatus as defined in either of claims 12 or 13 wherein said oil accumulating means comprises a porous material disposed to occupy substantially the full cross sectional area of said passageway.

15. The apparatus as defined in either of claims 12 or 13 further comprising a funnel-shaped constriction in said passageway between said oil accumulating means and said discharge end to increase the speed of the airstream as it leaves said discharge end.

16. The apparatus as defined in either of claims 12 or 13 further comprising control means for cyclically operating the apparatus in a predetermined time sequence.

17. The apparatus as defined in claim 13 further comprising transducer means for monitoring the pressure of each of the low pressure oil-free airstream and the high pressure airstream, and for actuating a signal upon either of such pressures falling below a predetermined minimum pressure.

18. In combination with a textile yarn processing machine having a series of rotary bearings positioned along the length thereof, a lubricating apparatus for supplying oil to each of the rotary bearings, and comprising
a duct, and a plurality of branch lines extending respectively from said duct to each bearing, and with each branch line having a discharge end located adjacent its respective bearing,
means for directing an airstream having oil mist droplets entrained therein through said duct and through each of said branch lines under a relatively low pressure,
means positioned adjacent the discharge end of each branch line for accumulating a quantity of the entrained oil from the moving airstream, and
means for selectively terminating said means for directing a low pressure airstream through said duct and for directing an oil-free airstream under a relatively high pressure through said duct and through each branch line to thereby propel the accumulated oil from each of the oil accumulating means outwardly at a relatively high speed from the discharge end of the associated branch line.

19. The combination as defined in claim 18 wherein each of said accumulating means comprises a porous material disposed to occupy substantially the full cross sectional area of the associated branch line, and each branch line further comprises a constriction disposed between said porous material and its discharge end to increase the speed of the airstream as it leaves such discharge end.

20. The combination as defined in either of claims 18 or 19 further comprising discharge duct means operatively associated with each bearing for conveying away air and oil emerging from the bearing.

21. The combination as defined in claim 20 wherein said discharge duct means includes an absorbant material which is adapted to absorb oil passing therethrough.

22. The combination as defined in claim 21 wherein said discharge duct means includes an annular passage disposed coaxially with the axis of the associated rotary bearing, and said absorbant material is in the form of a ring disposed at a location within said annular passage such that the oil passing therethrough is conveyed by centrifugal force toward said absorbant material.

* * * * *